Oct. 15, 1957 H. W. HAPMAN 2,809,744
DRIVING UNIT FOR BUCKET CONVEYORS
Filed July 10, 1953 3 Sheets-Sheet 1

INVENTOR.
BY Henry W Hapman
Barthel & Bugbee
Attys

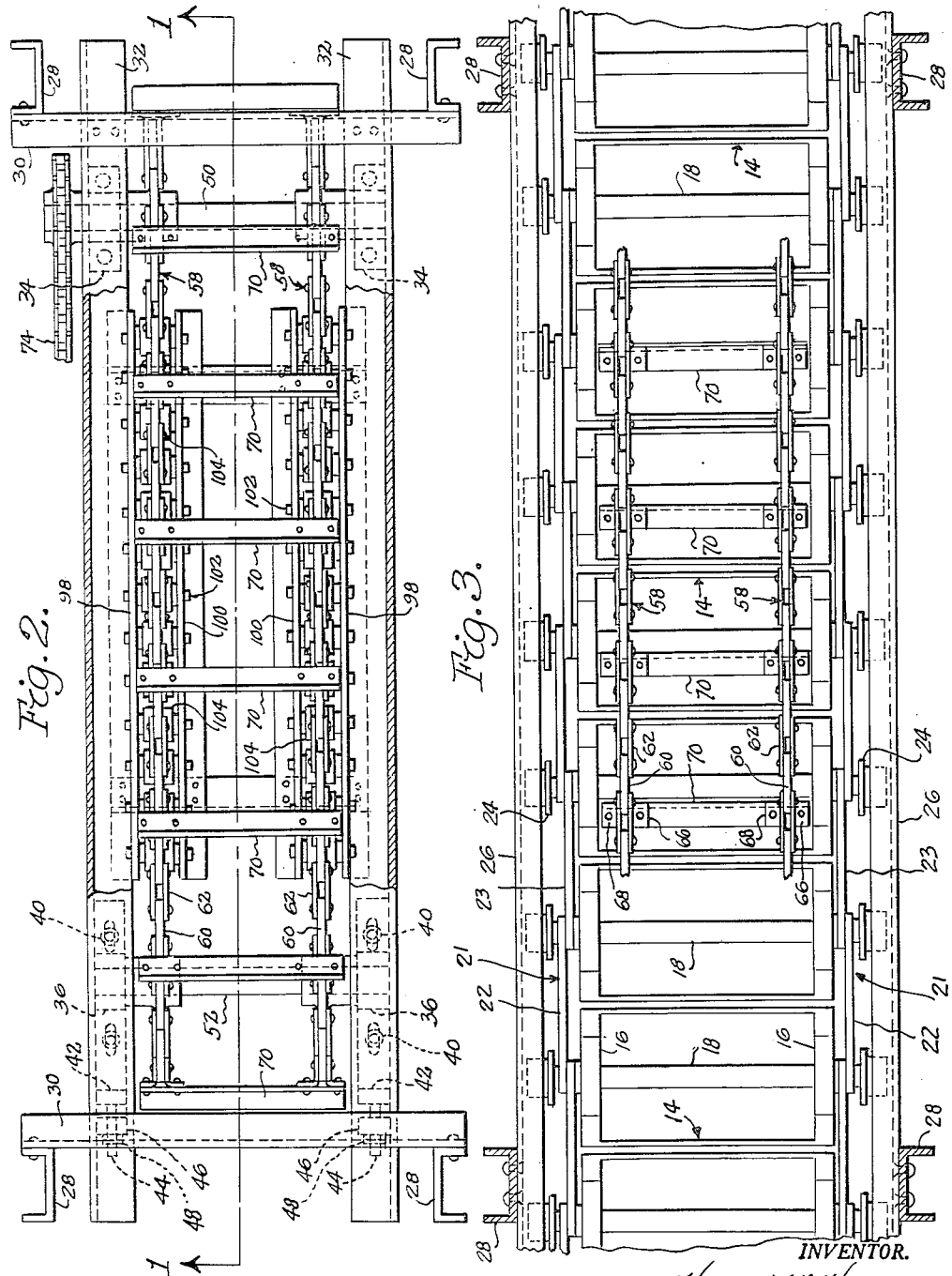

Oct. 15, 1957  H. W. HAPMAN  2,809,744
DRIVING UNIT FOR BUCKET CONVEYORS
Filed July 10, 1953  3 Sheets-Sheet 3
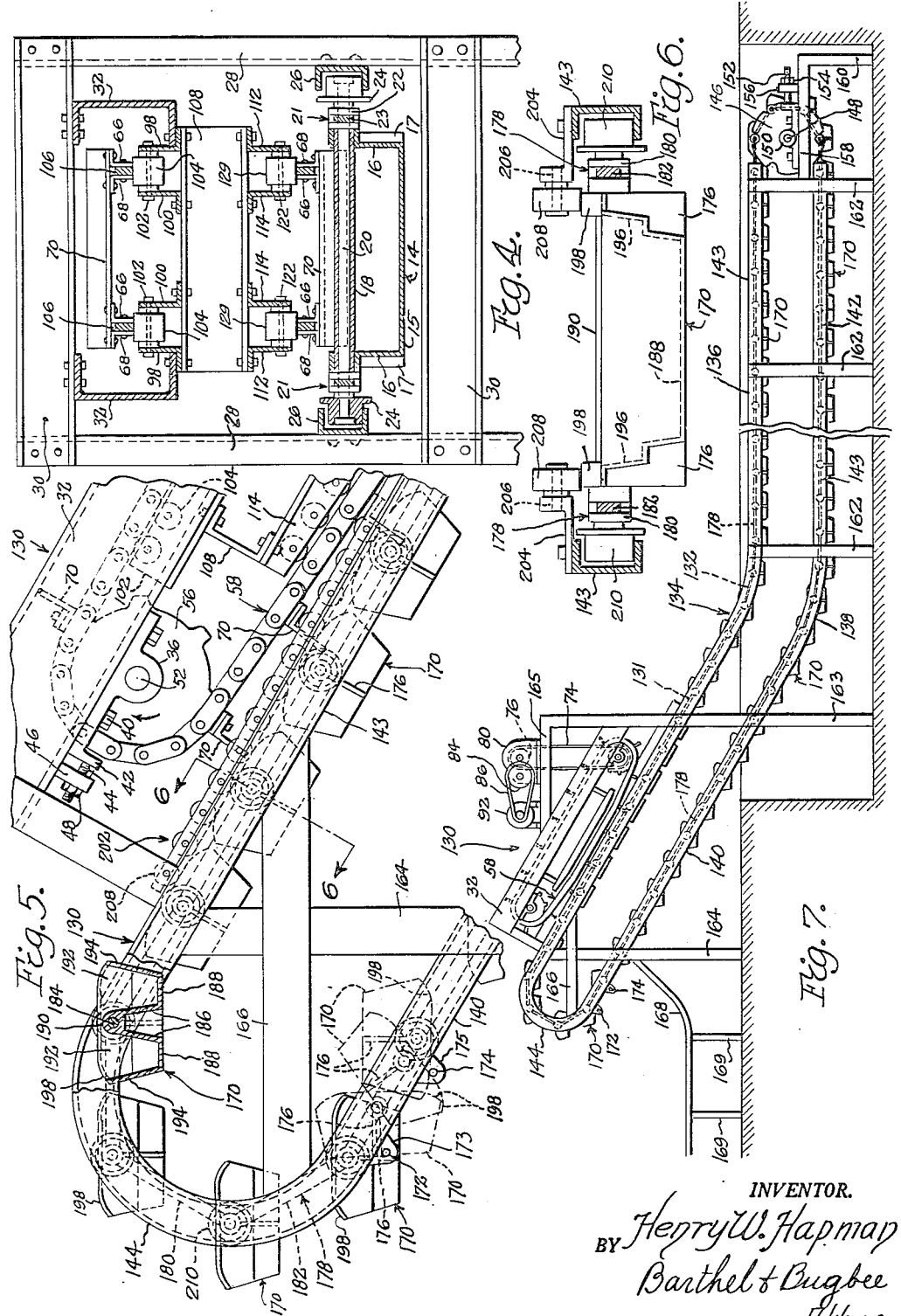
INVENTOR.
BY Henry W. Hapman
Barthel & Bugbee
Attys 2,809,744
Patented Oct. 15, 1957

2,809,744

DRIVING UNIT FOR BUCKET CONVEYORS

Henry W. Hapman, Hickory Corners, Mich., assignor of forty percent to Hannah Jane Hapman, Hickory Corners, Mich.

Application July 10, 1953, Serial No. 367,141

4 Claims. (Cl. 198—203)

This invention relates to bucket conveyors and, in particular, to driving arrangements for bucket conveyors.

One object of this invention is to provide a bucket conveyor driving unit having an endless flexible driving member which releasably engages the conveyor buckets individually as the endless flexible driving member moves in its orbital path.

Another object is to provide a bucket conveyor driving unit of the foregoing character wherein the driving mechanism includes a pair of endless flexible driving members traveling in orbits disposed in parallel planes and having bucket-contacting elements extending between said endless flexible members into releasable engagement with the individual conveyor buckets.

Another object is to provide a bucket conveyor driving unit of the foregoing character wherein the lower courses of the endless flexible driving members are directed downwardly in non-rectilinear sagging or downwardly-bowed paths so as to move downwardly into and upwardly out of engagement with the individual conveyor buckets while said courses are traversing said paths.

Another object is to provide a bucket conveyor driving unit as set forth in the object immediately preceding, wherein there are provided holddown members disposed in a non-rectilinear sagging path and engaging the lower courses of the endless flexible member to cause them to move also in non-rectilinear sagging paths.

Another object is to provide a bucket conveyor system including a driving unit of the foregoing character, the bucket conveyor system having endless flexible bucket-carrying members disposed in orbital paths, portions of these paths being inclined upwardly to a discharge station, the endless flexible driving mechanism engaging the inclined portions of the endless flexible bucket-carrying members.

Another object is to provide a bucket conveyor system of the foregoing character wherein the buckets are suspended from cross tubes containing axles connected to endless parallel conveyor chains, the cross tubes serving as driven members directly engaged by drive members on endless driving chains, so that the buckets move smoothly at uniform speed without jerking, and single link chains of great strength can be used.

Other objects and advantages of the invention will become apparent during the course of the following description of the accompanying drawings, wherein:

Figure 2 is a horizontal section, mainly in top plan view, taken along the line 2—2 in Figure 1;

Figure 3 is a horizontal section taken along the line 3—3 in Figure 1;

Figure 4 is an approximately vertical cross-section taken along the zigzag line 4—4 in Figure 1;

Figure 5 is a fragmentary side elevation, partly in vertical section, of the delivery end of a slightly modified bucket conveyor system employing the driving unit shown in Figures 1 to 4 inclusive;

Figure 6 is an approximately vertical but partly inclined cross-section through one of the buckets taken along the inclined line 6—6 in Figure 5; and Figure 7 is a side elevation of a complete installation of the slightly modified conveyor system shown in part in Figures 5 and 6, with the central portion thereof omitted to conserve space.

Figure 1:
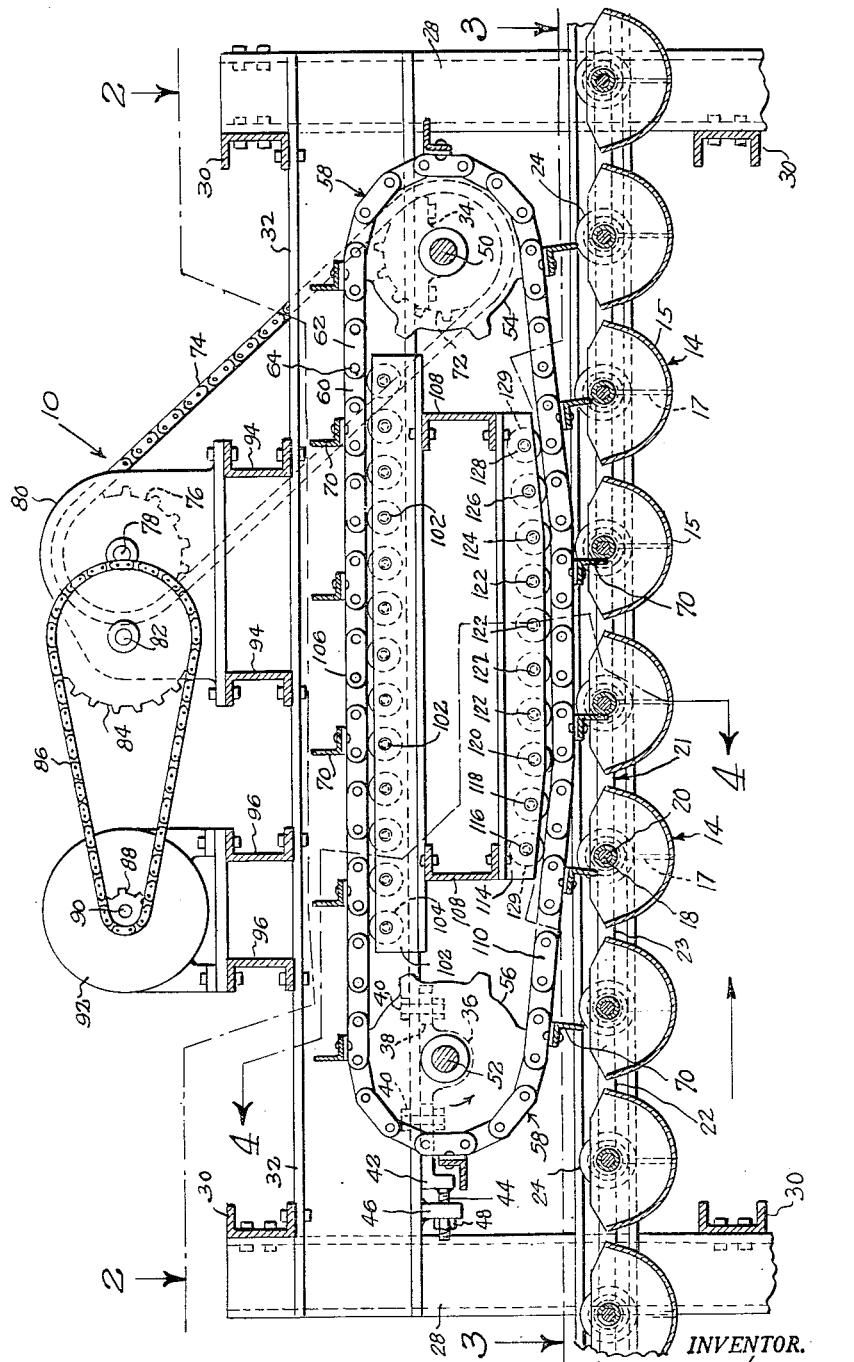
Figure 1 is a central longitudinal section through a bucket conveyor driving unit and bucket conveyor system according to one form of the invention, taken along the line 1—1 in Figure 2.

Hitherto, bucket conveyor systems having buckets mounted between spaced endless flexible members, such as conveyor chains, disposed in parallel orbital planes have been ordinarily supported on wheels or sprockets and driven thereby. In such a system, the buckets are drivingly connected directly to the conveyor chains so that the strain of driving the conveyor chains is exerted directly upon the chains by the drive sprockets or wheels, often at a location remote from the location where the buckets are subjected to the greatest weight or force, with the result that the chain stretches or breaks or sags excessively.

The bucket conveyor driving unit of the present invention eliminates the drive sprockets of the endless flexible conveyor members, such as conveyor chains, together with their attendant difficulties, and provides a driving mechanism consisting of endless flexible driving members traveling in orbital paths disposed in parallel planes and interconnected by bucket-contacting elements which individually engage each bucket or its supporting cross member so as to pull the bucket along a portion of the path of the endless flexible driving member and then release this member and its bucket. The present driving unit is mounted above the bucket conveyor system and its lower course is caused to droop in a sagging or downwardly-bowed path so that the conveyor bucket engaging elements travel downwardly into and upwardly out of engagement with each bucket-supporting cross member. The lower course is held in this sagging path by holddown elements, such as rollers having their peripheries disposed along the said sagging path.

Referring to the drawings in detail, Figures 1 to 5 inclusive show a bucket conveyor driving unit, generally designated 10, according to one form of the invention as applied to an endless bucket conveyor system, generally designated 12, including buckets, generally designated 14, the pans 15 of which have end walls 16 with bucket-inverting fins or lugs 17. The end walls 16 are interconnected by tubes or driven members 18 (Figure 4) through which pass bucket-supporting rods or axles 20 extending through endless parallel conveyor chains, generally designated 21. Each conveyor chain 21 consists of outer and inner links 22 and 23 pivoted at their opposite ends upon the axles 20. Beyond the chains 21, the rods or axles 20 at their outer ends carry flanged wheels or rollers 24 engaging the troughs of inwardly-directed channel track members 26 supported by vertical frame members 28 interconnected by cross members 30.

Bolted or otherwise secured to the cross members 30 between adjacent vertical members or uprights 28 are spaced parallel horizontal channel members 32 disposed with their troughs facing one another (Figure 4). Bolted or otherwise secured to the undersides of the lower flanges of the channel members 32 are two pairs of bearing brackets 34 and 36 respectively (Figure 1), the bearing brackets 34 being fixedly mounted on the channel members 32 and the bearing brackets 36 being slotted as at 38 for longitudinal reciprocation relatively to their retaining bolts 40. The bearing brackets 36 are provided with angle extensions 42 carrying adjusting screws 44 which pass through suitably bored cross members 46 and carrying adjusting nuts 48. Mounted for rotation in the bearing brackets 34 and 36 are sprocket shafts 50 and 52 respectively, these shafts carrying spaced sprockets 54 and 56 respectively. Supported on the sprockets 54 and 56 are parallel endless drive chains 58 composed of inner and outer links 60 and 62 pivotally interconnected by pivot pins 64. Oppositely-facing outer and inner angle brackets 66 and 68 (Figure 4) are bolted to the opposite sides of certain of the drive chain links 60 and 62 and bolted or otherwise secured to the opposite arms of the angle brackets 66 and 68 are elongated bucket-engaging and driving members 70. These members 70 are drivingly engageable with the driven members 18 and hence are spaced at intervals corresponding to the spacing of the tubes or driven members 18. The cross members 70 are conveniently made from angle members.

Keyed or otherwise drivingly secured to the sprocket shaft 50 is a drive sprocket 72 (Figure 1) with which meshes a driven output sprocket chain 74. The latter in turn meshes with and is driven by an output sprocket 76 mounted upon the output shaft 78 of a conventional reduction gear box 80, the input shaft 82 of which has an input sprocket 84 drivingly connected thereto and meshing with an input sprocket chain 86. The input sprocket chain 86 in turn meshes with a motor shaft sprocket 88 mounted on the armature shaft 90 of a motor 92. The reduction gear box 80 and motor 92 are bolted to and supported by parallel channel cross members 94 and 96 respectively, these in turn being bolted to the upper flanges of the longitudinal horizontal channel members 32.

Also bolted or otherwise secured to the lower flanges of the longitudinal channel members 32 are spaced outer and inner upper angle members 98 and 100 respectively (Figure 4), these carrying multiple spaced axles 102 which in turn carry upper chain-supporting rollers 104 disposed beneath the upper courses 106 of the drive chains 58. The axles 102 are disposed in a substantially common plane which, in Figure 1, happens to be horizontal although, as shown in Figures 5 to 7 inclusive, it may be disposed in an inclined plane in certain installations.

Also bolted or otherwise secured to and depending from the angle members 98 and 100 and longitudinal channel members 32 (Figure 4) are cross channel members 108 spaced apart from one another longitudinally along the channel members 32 (Figure 1). Bolted or otherwise secured to the lower flanges of the cross channel members 108 above the lower courses 110 of the drive chains 58 are longitudinal outer and inner angle members 112 and 114 respectively (Figure 4) which in turn carry axles 116 to 128 inclusive (Figure 1) with rollers 129, these axles not being arranged in a common plane but in a sagging, drooping or downwardly-bowed path. The axles 116 and 118 are arranged in a downwardly-inclined plane from the sprockets 56, the axles 120, 122 and 124 are arranged in a horizontal plane, and the axles 126 and 128 are arranged in an upwardly-inclined plane toward the sprockets 54, considering the sprockets 54 and 56 to rotate counterclockwise in the direction of the arrows (Figure 1) and the bucket conveyor system 12 to travel to the right in the direction of the arrow (Figure 1).

*Conveyor driving unit applied to inclined bucket conveyor system*

Figures 5 to 7 inclusive show a slight modification, generally designated 130, of the bucket conveyor driving unit 10 mounted in an inclined position and driving the inclined portion 131 of the upper course 132 of a bucket conveyor system, generally designated 134, the upper course 132 also having a horizontal portion 136. The lower course 138 of the bucket conveyor system 134 also has inclined and horizontal portions 140 and 142 respectively. These courses include guide track members 143 similar to the members 26 of Figure 4.

At their upper ends, the channel track members 143 of the inclined courses 131 and 140 are interconnected by arcuate portions 144 of approximately semi-circular extent.

At the opposite end of the bucket conveyor system 134, the track members 143 of the upper and lower horizontal courses 136 and 142 are not interconnected by arcuate portions 144 but are separated by gaps in which conveyor chain sprockets 146 are placed. The conveyor chain sprockets 146 (one only being shown) are mounted in axially-spaced relationship on a common shaft 148 journaled in journal bearings 150 which are slidable to and fro for chain slack adjustment under the influence of screw shafts 152 and nuts 154 (Figure 7) acting against a vertical frame member 156 mounted on horizontal frame members 158 which in turn are supported by vertical frame members 160 and 162. The trackway sections 140 and 142 are supported by other similar vertical frame members 162, whereas the upper inclined sections 131 and 140 are supported by vertical members 163 and 164 interconnected by horizontal members 165 and 166. Beneath the upper end of the bucket conveyor system 134, a downwardly-inclined delivery ramp structure 168 on legs 169 is provided for receiving the articles delivered by the buckets 170 as they are inverted at this location. The vertical members 160, 162, 163, 164 and 169 are interconnected by the usual cross members or braces (not shown).

The conveyor installation 134 in Figures 5, 6 and 7 and the special buckets 170 associated therewith are illustrated as applied to the task of receiving hot cast metal pigs at one end adjacent the sprockets 146, and conveying them upward along the portions 136 and 130 and around the arcuate portions 144, whereupon the buckets 170 are inverted by a pair of bucket-inverting rollers or pins 172 and 174 mounted on brackets 173 and 175 secured to each side of the conveyor system 130 (Figures 5 and 7). These pins 172 and 174 are fixedly mounted adjacent the upper ends of the lower inclined conveyor portions 140 and the pins 172 engage the fins or lugs 176 on the ends of the buckets 170 successively to partially invert the buckets 170 as the latter are carried forward by their conveyor chains, generally designated 178, as explained below in connection with the operation.

The conveyor chains 178 consist of overlapping outer and inner links 180 and 182 (Figure 5) pivoted at their opposite ends on the bucket supporting rods 184 in a manner similar to that described in connection with the chain 21 in Figures 1 to 4 inclusive and hence requiring no further details of description. The buckets 170, however, are of slightly different construction from the buckets 14 in that they are intended to accommodate two elongated solid objects each, instead of powdered or granulated material. For this reason, the bucket 170 has inner walls 186 converging toward one another from the bottom walls 188 and joining a common elongated hub 190 which is bored to receive the conveyor supporting rod or axle 184 and also serves as a driven member for the latter, in a manner analogous to the function of the driven member 18 in Figure 4.

The pockets 192 between the inner walls 186 and outer walls 194 of the buckets 170 are closed at their opposite ends by end walls 196 upon which the previously-mentioned lugs or fins 176 are formed or mounted. The end walls 196 are also provided with downwardly-bent horizontal flanges 198 at their upper ends, for guidance and holddown purposes, such as to hold the buckets in particular positions at certain stages of the cycle of operations of the conveyor system, as shown in the right-hand corner of Figure 5 and in Figures 6 and 7.

The bucket conveyor driving unit 130 is generally similar in construction and mode of operation to the bucket conveyor driving unit 10 of Figures 1 to 4 inclusive and differs only in its position of mounting and in the additional bucket holddown arrangement, generally designated 202. The latter (Figures 5 and 6) consists of a pair of inwardly-facing angle members 204 bolted or otherwise secured to the upper flanges of the guide track channel members 143 which correspond to the similar members 26 in Figures 1 to 4 inclusive. The upright flanges of these angle members 204 are bored at intervals therealong to receive the outer ends of axles 206, the inner ends of which carry holddown rollers 208 which engage the holddown flanges 198 of the buckets 170 as these successively pass beneath the holddown arrangement 202. The buckets 170, while being conveyed in this manner by the conveyor chains 178, are supported by flanged wheels 210 (Figure 6) mounted on the outer ends of the supporting rods or axles 184, in a manner similar to that shown in cross-section in the lower left-hand portion of Figure 4.

The remainder of the conveyor driving unit 130 is similar in construction and operation to the conveyor driving unit 10 except that the driving motor 92 and reduction gearbox 80 are mounted horizontally on the horizontal members 165 instead of the otherwise inclined position which would be necessitated by mounting them directly upon the longitudinal members 32, as in Figure 1.

Operation

The operation of the bucket conveyor driving unit 10 of Figures 1 to 4 inclusive and 130 of Figures 5 to 7 inclusive is generally the same, with certain differences arising from the inclined position of the conveyor system 134 in Figures 5 to 7 inclusive. Considering first the operation of the driving unit 10 of Figures 1 to 4 inclusive, with the bucket conveyor system 12 arranged to travel horizontally in its guide track channel members 26 at the location where it passes beneath the driving unit 10, when the motor 92 is energized, it drives the sprockets 72 and 54 and shaft 50 at a reduced speed through the train of mechanism including the motor sprocket 88, the input sprocket chain 86 and sprocket 84, the output sprocket 76 and sprocket 74 and driven sprocket 72.

The parallel endless conveyor drive chains 58, and the bucket driving member 70 are caused to travel in orbital paths between the counterclockwise rotating sprockets 54 and 56. As the upper courses 106 of the drive chains 110 pass over the rollers 104, their links 60 and 62 are held in horizontal position (Figure 1), but of course flex relatively to one another around their pivot pins 64 when they pass around the sprockets 56 and enter the lower courses 110 of the drive chains 58. At this location, the chains 58 are engaged successively by the rollers 129 on the axles 116, 118, and 120 in a downwardly-inclined path, causing the lower courses 110 to sag or droop downward in such a manner as to bring the bucket-contacting members 70 into engagement with the driven members 18 surrounding the bucket supporting rods 20, as shown at the bottom portion of Figure 1. As the chains links 61, 62 continue to pass along under the rollers 129 on the axles 120, 122 and 124 arranged in a horizontal plane, the members 70 push the buckets 14 along in this manner, driving the bucket conveyor system 12 in a positive manner by direct engagement of the buckets rather than by the use of sprockets engaging the conveyor chains 21.

When, however, the links 61, 62 of the lower course pass beyond the rollers 129 on the axles 124, they move upwardly in an inclined path controlled by the rollers 129 on the axles 126 and 128 arranged in an inclined plane, so that the bucket-contacting members 70 at this point release their hold upon the buckets 14 and pass above and clear their protecting tubes 18 and rods 20. Thus each bucket is given a positive push as it passes beneath the driving unit 10 by force applied directly to the bucket supporting tubes 18 and rods 20.

In the operation of the inclined bucket conveyor system 134 of Figures 5 to 7 inclusive, the bucket conveyor driving unit 130 operates in substantially the same manner as the driving unit 10 just described, except that, in this particular installation, the bucket conveyor 134 happens to travel in a counterclockwise direction rather than in a clockwise direction, as in Figures 1 to 4 inclusive. For this reason, the sprockets 54 and 56 and the drive chains 58 travel in clockwise directions, moving the conveyor-engaging members 70 upwardly in an inclined path as they engage the hubs 190 of the conveyor buckets 170 and push them upward in the same inclined path.

It will be observed from Figure 7, however, that at the lower end of the upper inclined course 131 of the bucket conveyor system 134, the buckets 170 hang in their natural vertical positions by reason of their being suspended from their supporting rods 184. As soon as the buckets 170 pass beneath the conveyor drive unit 130, however, their top flanges 198 on their end members 196 are engaged by the rollers 208, forcibly inclining the buckets 170 so that their bottoms 188 are parallel to the inclined path of travel of the conveyor course 130 while their hubs 190 are engaged by the conveyor contacting members 70 (Figure 5). However, when the buckets 170 pass out from beneath the drive unit 130, as seen at the top of Figure 5, they resume their naturally-hanging vertical positions because of the release of their hold down flanges 198 by the rollers 208.

The buckets 170 pass around the arcuate track portions 144 to the upper end of the lower inclined course 140 of the conveyor system 134, whereupon the fins or lugs 176 engage the rollers or pins 172. As the bucket 170, thus engaged, moves onward, it is partially inverted, throwing it into the first or upper dotted line position (Figure 5). As it continues to move onward, the second pins or rollers 174 engage the top flanges 198 of the buckets 170, completing the inversion thereof into the second and third dotted line positions of Figure 5, dumping out the contents of the buckets onto the ramp structure 168. From the latter, the articles slide downward and are picked up by a conveyor, truck, receptacle or other means of disposing or further processing of them.

What I claim is:

1. In a bucket conveyor system, a conveyor supporting structure, a plurality of pairs of conveyor-chain-supporting wheels rotatably mounted thereon, the corresponding wheels of said pairs of wheels being aligned with one another, a pair of endless conveyor chains mounted on said wheels, conveyor bucket axles extending between and connected to said conveyor chains at intervals therealong, conveyor buckets mounted on and depending from said axles, a conveyor driving unit framework mounted adjacent said conveyor chains, a pair of shafts journaled in said framework in spaced parallel relationship, a motor, mechanism drivingly connecting said motor to one of said shafts, a plurality of pairs of drive-chain-supporting wheels mounted on said shafts with the corresponding wheels of said pairs of wheels disposed in aligned relationship with one another, a pair of endless flexible bucket-driving chains carried by said wheels and traveling therebetween in orbital paths disposed in parallel planes, each of said paths having a portion thereof traveling adjacent a portion of said conveyor chains, and elongated bucket-engaging elements extending between and connected to said endless flexible driving chains at spaced intervals therealong, said bucket-engaging elements projecting outwardly from said endless flexible member into intercepting driving engagement with said conveyor bucket axles near the opposite ends of said buckets and also substantially throughout the intermediate portions thereof between said bucket ends.

2. A driving unit for conveyor buckets carried by endless parallel conveyor chains with inclined courses, said unit comprising a framework disposed adjacent said inclined courses, a pair of shafts journaled in said framework in spaced parallel relationship, a motor, mechanism drivingly connecting said motor to one of said shafts, a plurality of wheels mounted on said shafts in aligned relationship, an endless flexible bucket-driving member carried by said wheels and traveling therebetween in an orbital path having a portion thereof traveling adjacent a portion of said conveyor chains, bucket-engaging elements connected to said endless flexible member at spaced intervals therealong, said bucket-engaging elements projecting outwardly from said endless flexible member into intercepting driving engagement with said buckets, and bucket holddown elements disposed adjacent said inclined courses in contacting engagement with said buckets and forcibly holding said buckets temporarily in inclined positions adjacent said unit.

3. A driving unit for conveyor buckets carried by endless parallel conveyor chains with inclined courses, said unit comprising a framework disposed adjacent said inclined courses, a pair of shafts journaled in said framework in spaced parallel relationship, a motor, mechanism drivingly connecting said motor to one of said shafts, a plurality of wheels mounted on said shafts in aligned relationship, an endless flexible bucket-driving member carried by said wheels and traveling therebetween in an orbital path having a portion thereof traveling adjacent a portion of said conveyor chains, guiding devices engaging said adjacent portion of said endless flexible member and urging the same outwardly beyond the normal path of travel thereof between said wheels, bucket-engaging elements connected to said endless flexible member at spaced intervals therealong, said bucket-engaging elements projecting outwardly from said endless flexible member into intercepting driving engagement with said buckets, and bucket holddown elements disposed adjacent said inclined courses in contacting engagement with said buckets and forcibly holding said buckets temporarily in inclined positions adjacent said unit.

4. A driving unit for conveyor buckets carried by endless parallel conveyor chains with inclined courses, said unit comprising a framework, disposed adjacent said inclined courses, a pair of shafts journaled in said framework in spaced parallel relationship, a motor, mechanism drivingly connecting said motor to one of said shafts, a pair of wheels spacedly mounted on each shaft, the corresponding wheels of said shafts being aligned with one another, a pair of endless flexible bucket-driving members carried by said wheels and traveling therebetween in orbital paths having portions thereof traveling adjacent portions of said conveyor chains, and bucket-engaging elements connected between said endless flexible members at spaced intervals therealong, said bucket-engaging elements projecting outwardly from said endless flexible members into intercepting engagement with said buckets, and bucket holddown elements disposed adjacent said inclined courses in contacting engagement with said buckets and forcibly holding said buckets temporarily in inclined positions adjacent said unit.

References Cited in the file of this patent

UNITED STATES PATENTS

| 362,571 | Chase | May 10, 1887 |
| 795,166 | Piez | July 18, 1905 |
| 802,047 | Krell | Oct. 17, 1905 |
| 906,858 | Blum | Dec. 15, 1908 |
| 1,279,579 | Perkins | Sept. 24, 1918 |
| 2,168,852 | Webb et al. | Aug. 8, 1939 |
| 2,609,086 | McBride et al. | Sept. 2, 1952 |

FOREIGN PATENTS

| 997,091 | France | Sept. 5, 1951 |